E. F. FITZGERALD.
VALVE.
APPLICATION FILED AUG. 18, 1911.
1,037,139.
Patented Aug. 27, 1912.
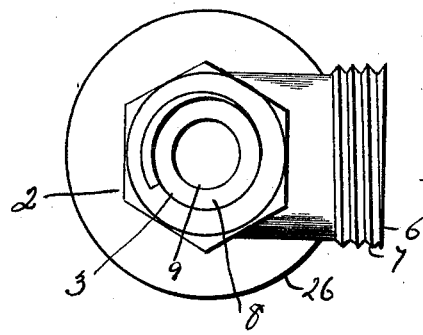
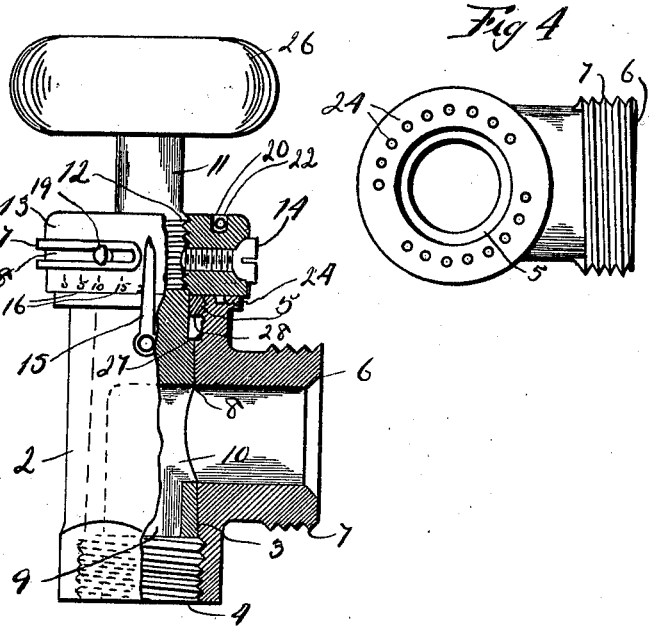
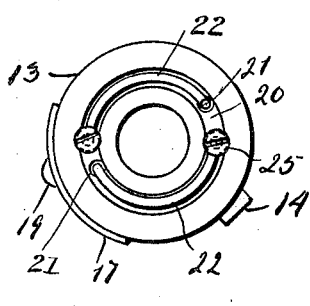
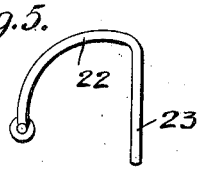
Witnesses
Francis O. Bocock
J. H. Williamson
Inventor
Edward F. Fitzgerald
By H. H. Williamson
Attorney
COLUMBIA PLANOGRAPH CO., WASHINGTON, D. C.

UNITED STATES PATENT OFFICE.

EDWARD F. FITZGERALD, OF PHILADELPHIA, PENNSYLVANIA.

VALVE.

1,037,139.  Specification of Letters Patent.  Patented Aug. 27, 1912.

Application filed August 18, 1911. Serial No. 644,740.

*To all whom it may concern:*

Be it known that I, EDWARD F. FITZGERALD, a citizen of the United States, residing at Philadelphia, in the county of Philadelphia and State of Pennsylvania, have invented a certain new and useful Improvement in Valves, of which the following is a specification.

My invention relates to new and useful improvements in valves, and has for its object to provide an exceedingly simple and effective device of this character in which the valve plug will be conical in shape and adapted to enter the valve casing, the entire faces of the walls of which converge toward that portion of the casing having no means for attachment to a pipe line and to provide a passage way through the valve plug for the passage of steam, air, water or other fluids.

A further object of the invention is to provide the valve plug with a stem on which is threaded a collar which also acts as a nut and carries indication marks with which registers an arrow or pointer for indicating how wide the outlet is open. This collar may also carry means for stopping the rotation of the valve plug at two opposite points, one of these stops being adjustable. This collar may also carry resilient registering means adapted to hold the valve plug at any determined position.

A still further object of the invention is to provide a buffer for the valve plug preventing the valve plug from wedging itself, when the pressure is very great.

With these ends in view, my invention consists in the details of construction and combination of elements hereinafter set forth and then specifically designated by the claims.

In order that those skilled in the art to which this invention appertains, may understand how to make and use the same, I will describe its construction in detail, referring by characters to the accompanying drawing forming a part of this specification, in which—

Figure 1, is an end view of a valve made in accordance with my improvement. Fig. 2, a side elevation thereof, one portion being shown in section to clearly illustrate the construction. Fig. 3, a plan view of the collar. Fig. 4, an end view of the casing with the valve plug and collar removed for showing the notches adapted to register with the resilient, registering and holding means. Fig. 5 is an enlarged view of one of the arcuate springs.

In carrying out my invention as here embodied, 2 represents the casing having a passage way 3 therethrough, the walls of which converge from the threaded opening 4, toward the threaded opening 5. From the side of the casing leads an outlet 6, preferably threaded externally as at 7, whereby a pipe may be attached thereto. In the passage way 3 is mounted the valve plug 8, which is conical in shape, and this valve plug is provided with an opening 9, leading from the large or base end thereof to a suitable point intermediate its ends, and from this opening leads the outlet 10, which is adapted to register with the outlet 6, of the casing. The smaller end of the valve plug carries a stem 11, provided with threads 12, on which is threaded the collar 13, until it rests upon the face of one end of the casing, in which position it is held by the screw 14, which passes through the collar and engages the valve stem. The head of this screw preferably extends beyond the face of the collar to permit its engagement with the indicator 15 which is permanently mounted upon the casing and over-lies the collar in the path of travel of the screw, thus acting as a stop when the valve is entirely closed. Said indicator will also register with the indication marks 16, formed upon the collar, to show the person using the same how far the valve is open.

If after using the valve a certain point is fround where the device is open the desired distance, then this point may be retained by the adjustable stop 17, comprising an arcuate strip having a slot 18 therein through which passes a screw 19, said screw being threaded into the collar for holding the stop in a pre-determined adjustment upon the collar, and as the indicator is in the line of travel to said stop, then when the valve is open the desired distance, said stop coming into engagement with the indicator will prevent the valve plug from being turned farther. A further means of indicating how far the valve is open is by a pair of springs, the ends of which register with suitable notches insuring the valve plug against rotation after once being set, and the operator will be able to tell how far open the valve plug is through the sense of feeling, for as the springs enter the notches the vibration caused by this movement will be transmitted to the hand of the operator. One way of constructing this latter indicator and stop is to form an annular groove 20 in the collar 13 and having two openings 21 leading therefrom through said collar. These holes being at opposite sides of the collar, but in a slightly staggered relation, that is one opening on each side of a line drawn through the center of the collar. In the groove 20, is mounted a pair of arcuate springs 22, one end of each projecting at right angles to form the extensions 23, which pass through the openings 21, the ends of said extensions projecting beyond the inner faces of the collar and adapted to register with the notches 24, which may be of any desired shape. One half of the pair of notches are formed upon one side of the casing, while the other half of the notches are formed upon the other side, and one set of said notches are in staggered relation to the other set so that when rotating the valve plug, the end of one spring will enter the notch while the end of the opposite spring will rest upon the metal intermediate two notches. By placing the notches in these positions, it permits a very small attachment for the valve plug, which could not be accomplished were it necessary to place all of the notches upon one side of the casing.

The springs are held in place by a desirable fastening means such as screws 25 which pass through loops formed upon the opposite ends of the springs, said screws being then threaded into the collar.

26 denotes a suitable handle mounted upon the valve stem whereby the valve may be rotated. The valve stem is of smaller diameter than the smallest end of the valve plug producing a shoulder 27, which will engage with the threaded annular buffer 28 mounted in the casing preventing the valve plug from wedging itself in the passage way 3 so tightly as to keep it from being readily turned. The pressure of the water, steam or the like entering the opening 9, will contact with the end wall of said opening 9, and force the valve plug into place, thus keeping said plug securely in position at all times to prevent leakage, and when this pressure is very great, it is likely to force the valve plug so tightly in the passage way as to prevent it from turning, but by the use of the buffer 28, the movement of the valve plug will be limited.

This valve is especially adapted for use with vapor heating systems, since the stop may be so set that one valve will not be turned on full to heat one radiator to its full capacity and at the same time keep other radiators in the same system from obtaining their proper share of the heat.

Of course I do not wish to be limited to the exact details of construction as here described, as these may be varied within the limits of the appended claims without departing from the spirit of my invention.

Having thus fully described my invention, what I claim as new and useful, is—

1. A valve comprising a casing, having a passage way therethrough, the inner walls of which converge toward one end and having an outlet leading from said passage way, a conical shaped valve plug having a hole terminating intermediate the ends of the valve plug, said valve plug also having an outlet leading from the hole, adapted to register with the outlet of the casing, a threaded valve stem carried by the valve plug, a handle mounted upon the stem, a collar threaded upon the valve stem, said collar engaging the end of the casing, means for holding said collar in its adjusted position, an indicator carried by the casing and over-lying the collar, and adjustable means carried by the collar adapted to engage the indicator to limit the movements of the valve plug.

2. A valve comprising a casing, having a passage way therethrough, the inner walls of which converge toward one end and having an outlet leading from said passage way, a conical shaped valve plug having a hole terminating intermediate the ends of the valve plug, said valve plug also having an outlet leading from the hole, adapted to register with the outlet of the casing, a threaded valve stem carried by the valve plug, a handle mounted upon the stem, a collar threaded upon the valve stem, said collar engaging the end of the casing, a screw passing through the collar engaging the stem to hold said collar in its adjusted position, said screw projecting beyond the outer face of the collar, an adjustable stop mounted upon the collar, indication marks on the collar, and an indicator mounted upon the casing, and over-lying the collar so that it will be in the line of travel of the stop and screw thereby limiting the movements of the valve plug.

3. A valve comprising a casing, having a passage way therethrough, the side walls of which converge from one end to the other, each end being threaded and provided with an outlet, said casing having two sets of staggered notches formed in that end of the casing where the smaller portion of the passage way is situated, a conical valve plug having a stem of smaller diameter to produce a shoulder, said valve plug provided with a hole entering the large or base end thereof and terminating intermediate the ends of the valve plug with an outlet leading therefrom adapted to register with the outlet in the casing, a buffer threaded in the casing adapted to engage the shoulder of the valve plug to prevent said valve plug from becoming tightly wedged, a collar carried by the stem, and means carried by said collar for engagement with the staggered notches to indicate the relation of the outlet in the valve to the outlet in the casing, and to hold said valve plug in the different adjusted positions.

4. A valve comprising a casing, having a passage way therethrough, the side walls of which converge from one end to the other, each end threaded and provided with an outlet, said casing having two sets of staggered notches formed in that end of the casing where the smaller portion of the passage way is situated, a conical valve plug having a stem of smaller diameter to produce a shoulder, said valve plug provided with a hole entering the large or base end thereof and terminating intermediate the ends of the valve plug with an outlet leading therefrom adapted to register with the outlet in the casing, a buffer threaded in the casing adapted to engage the shoulder of the valve plug to prevent said valve plug from becoming tightly wedged, a collar having an annular groove therein with openings leading therefrom passing entirely through the collar, a pair of springs mounted in the groove having extensions which pass through the holes, the projecting ends registering with the notches in the casing, said collar being mounted upon the valve stem, and means for holding said collar in its adjusted position with relation to the valve stem.

5. A valve comprising a casing, having a passage way therethrough, the side walls of which converge from one end to the other, each end threaded and provided with an outlet, said casing having two sets of staggered notches formed in that end of the casing where the smaller portion of the passage way is situated, a conical valve plug having a stem of smaller diameter to produce a shoulder, said valve plug provided with a hole entering the large or base end thereof and terminating intermediate the ends of the valve plug with an outlet leading therefrom adapted to register with the outlet in the casing, a buffer threaded in the casing adapted to engage the shoulder of the valve plug to prevent said valve plug from becoming tightly wedged, a collar having an annular groove therein with openings leading therefrom passing entirely through the collar, a pair of springs mounted in the groove having extensions which pass through the openings, the projecting ends registering with the notches in the casing, said collar being mounted upon the valve stem, a screw passing through the collar engaging the stem to hold said collar in its adjusted position with relation to the stem, an adjustable stop formed of a strip of metal having an elongated slot therein, a screw passing through said slot and threaded into the collar for holding the stop upon the collar and in its different adjusted positions, indication marks upon the collar whereby said stop may be adjusted, and an indicator carried by the casing over-lying the collar and being situated in the path of travel of the screw which holds the collar in position and the stop.

In testimony whereof, I have hereunto affixed my signature in the presence of two subscribing witnesses.

EDWARD F. FITZGERALD.

Witnesses:
 JOSEPH N. SAVILL,
 FRANCIS A. POWELL.

Copies of this patent may be obtained for five cents each, by addressing the "Commissioner of Patents, Washington, D. C."